US012409617B2

(12) United States Patent
Velasquez et al.

(10) Patent No.: US 12,409,617 B2
(45) Date of Patent: Sep. 9, 2025

(54) COMPOSITE COMPACTION SYSTEM SUPPORTED BY A NUMBER OF MORPHABLE BAG SUPPORTS

(71) Applicant: The Boeing Company, Chicago, IL (US)

(72) Inventors: Luis Velasquez, Charleston, SC (US); Cristina Velasquez, Daytona Beach, FL (US)

(73) Assignee: The Boeing Company, Chicago, IL (US)

( * ) Notice: Subject to any disclaimer, the term of this patent is extended or adjusted under 35 U.S.C. 154(b) by 322 days.

(21) Appl. No.: 18/150,676

(22) Filed: Jan. 5, 2023

(65) Prior Publication Data
US 2024/0227326 A1      Jul. 11, 2024

(51) Int. Cl.
  *B29C 70/44*    (2006.01)
  *B29C 70/54*    (2006.01)
  *B29L 31/30*    (2006.01)

(52) U.S. Cl.
  CPC .......... *B29C 70/443* (2013.01); *B29C 70/446* (2013.01); *B29C 70/544* (2021.05); *B29L 2031/3082* (2013.01)

(58) Field of Classification Search
  None
  See application file for complete search history.

(56) References Cited

U.S. PATENT DOCUMENTS

| | | | |
|---|---|---|---|
| 9,375,908 B2 | 6/2016 | Metschan et al. | |
| 9,636,876 B2 | 5/2017 | Lee et al. | |
| 10,399,284 B2 | 9/2019 | Prause et al. | |
| 11,364,692 B2 | 6/2022 | Padovano et al. | |
| 2020/0047433 A1* | 2/2020 | Dostal | B29C 70/542 |
| 2021/0107169 A1 | 4/2021 | Velasquez et al. | |
| 2021/0283868 A1 | 9/2021 | Anderson et al. | |
| 2023/0110534 A1* | 4/2023 | Yamato | B29C 70/446 264/241 |

OTHER PUBLICATIONS

Extended European Search Report, dated May 28, 2024, regarding EP Application No. 23216020.0, 8 pages.

* cited by examiner

*Primary Examiner* — Farah Taufiq
(74) *Attorney, Agent, or Firm* — Yee & Associates, P.C.

(57) ABSTRACT

Composite compaction system and method of use are presented. A method of supporting a composite compaction system is presented. A number of morphable bag supports of the composite compaction system is held in a retracted state. A contact face of a vacuum bag of the composite compaction system is placed in contact with a composite material on a support structure. The number of morphable bag supports is placed in an engaged state to conform to the support structure.

24 Claims, 12 Drawing Sheets

COMPOSITE COMPACTION SYSTEM SUPPORTED BY A NUMBER OF MORPHABLE BAG SUPPORTS

BACKGROUND INFORMATION

1. Field

The present disclosure relates generally to composite processing and more specifically to methods and apparatus for performing compaction on a composite material.

2. Background

Composite materials are strong, light-weight materials created by combining two or more functional components. For example, a composite material may include reinforcing fibers bound in polymer resin matrix. The fibers can take the form of a unidirectional tape, woven cloth or fabric, or a braid.

In manufacturing composite structures, layers of composite material are typically laid up on a tool. The layers may be comprised of fibers in sheets. In some cases, resin may be infused or pre-impregnated into the sheets. These types of sheets are commonly referred to as prepreg.

After laying up a layer of composite material on a tool, the composite material can be compacted onto the tool. Compaction can flatten and remove air and wrinkles from the composite material. It can be undesirably difficult to apply conventional composite compaction films over objects, especially those with a contour.

Therefore, it would be desirable to have a method and apparatus that takes into account at least some of the issues discussed above, as well as other possible issues.

SUMMARY

An embodiment of the present disclosure provides a method of supporting a composite compaction system. A number of morphable bag supports of the composite compaction system is held in a retracted state. A contact face of a vacuum bag of the composite compaction system is placed in contact with a composite material on a support structure. The number of morphable bag supports is placed in an engaged state to conform to the support structure.

An embodiment of the present disclosure provides a composite compaction system. The composite compaction system comprises a vacuum bag having a contact face configured to contact a composite material and a support face opposite the contact face, and a number of morphable bag supports formed of a flexible polymeric material connected to the support face and configured to morph between a retracted state and an engaged state.

An embodiment of the present disclosure provides a composite compaction system. The composite compaction system comprises a vacuum bag having a contact face configured to contact a composite material and a support face opposite the contact face, and a number of morphable bag supports formed of a flexible polymeric material connected to the support face and configured to morph between a retracted state and an engaged state. Each morphable bag support comprises fingers extending away from the support face and separated by gaps, and pressure chambers within the fingers connected by an internal channel.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative examples recognize and take into account one or more different considerations. The illustrative examples recognize and take into account that existing automated solutions for composite compaction involve the use of linear actuators to support and manipulate compaction films from a single contact point. The illustrative examples recognize and take into account that the single contact point can provide an undesirably low amount of support of the film. The illustrative examples recognize and take into account that the rigidity of the mechanism can prevent the compaction film from adequate seating on contoured surfaces.

The illustrative examples recognize and take into account that current compaction bag supports present some issues. The illustrative examples recognize and take into account that current compaction bag supports present insufficient support of compaction bag due to attachment points located only at corners. The illustrative examples recognize and take into account that current compaction bag supports provide a lack of conformity and adequate sealing of compaction bag to contoured surface due to current rigid supports. The illustrative examples also recognize and take into account that undesirably restraining the bag using the current compaction bag supports could undesirably impact the composite structure underneath.

Figure 1:
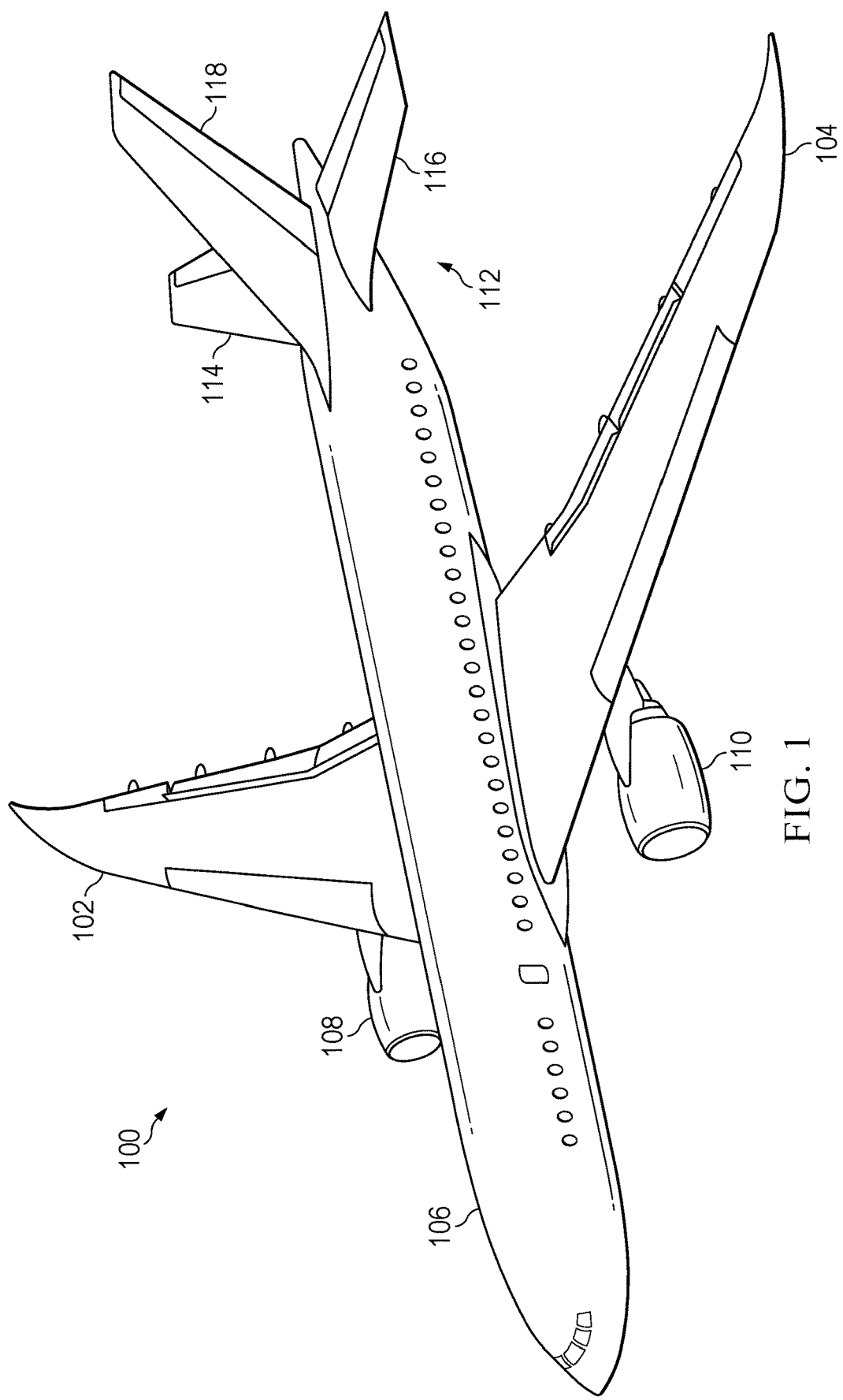
FIG. 1 is an illustration of an aircraft in accordance with an illustrative embodiment.

Turning now to FIG. 1, an illustration of an aircraft is depicted in accordance with an illustrative embodiment. Aircraft 100 has wing 102 and wing 104 attached to body 106. Aircraft 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106.

Aircraft 100 is an example of an aircraft having composite components that can be manufactured using composite compaction system of the illustrative examples.

Figure 2:
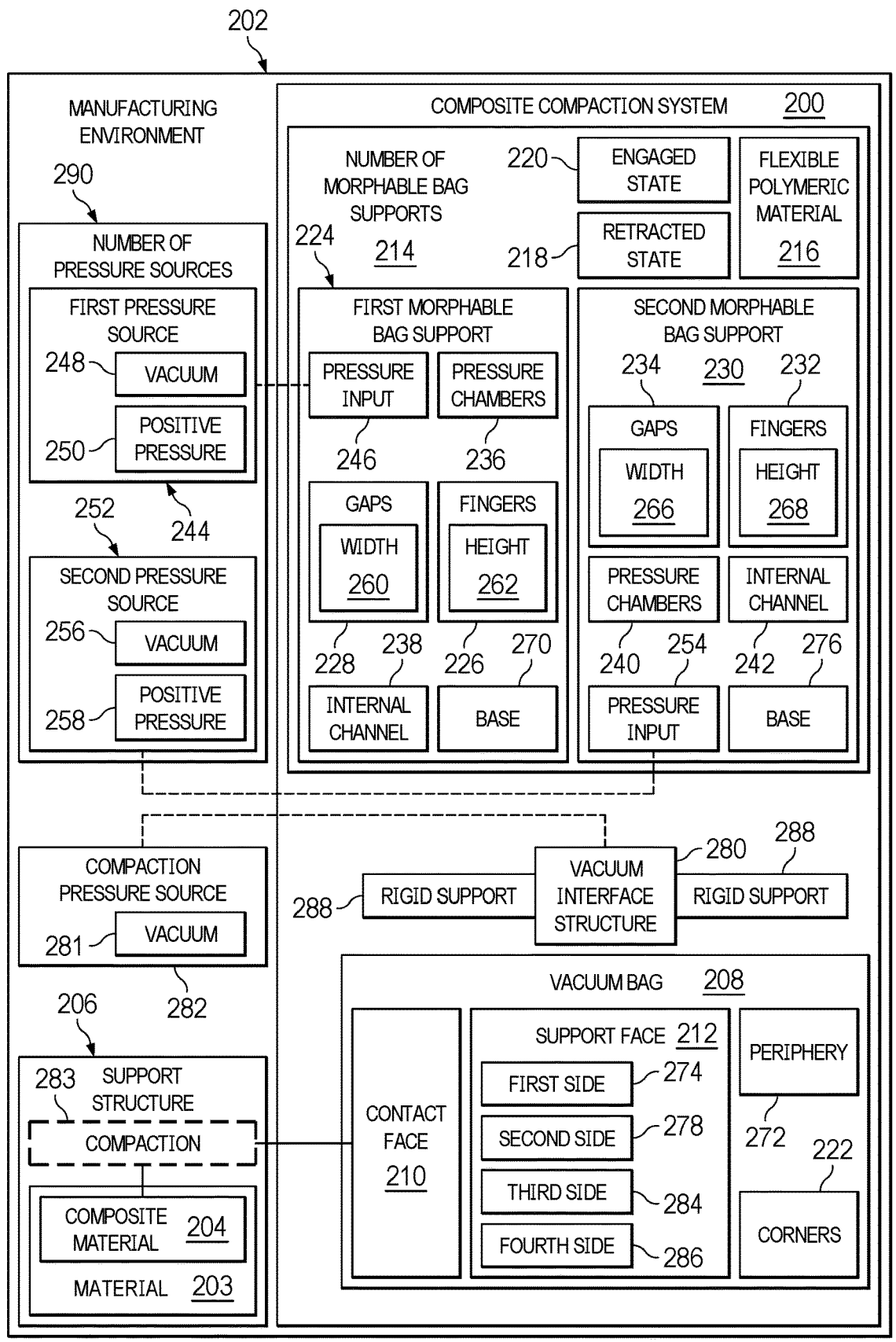
FIG. 2 is an illustration of a block diagram of a manufacturing environment in accordance with an illustrative embodiment.

Turning now to FIG. 2, an illustration of a block diagram of a manufacturing environment is depicted in accordance with an illustrative embodiment. Composite compaction system 200 in manufacturing environment 202 can be used to compact material 203 against support structure 206. In some illustrative examples, material 203 takes the form of composite material 204. In some illustrative examples, support structure 206 takes the form of a mandrel or other type of tool. In some illustrative examples, support structure 206 takes the form of a substrate, such as a portion of a part.

Composite compaction system 200 comprises vacuum bag 208 having contact face 210 and support face 212 opposite contact face 210. Contact face 210 is configured to contact material 203. In some illustrative examples, contact face 210 is configured to contact composite material 204. Composite compaction system 200 also comprises number of morphable bag supports 214 connected to support face 212 and configured to morph between retracted state 218 and engaged state 220. In retracted state 218, number of morphable bag supports 214 can lift corners 222 of vacuum bag 208. In retracted state 218, number of morphable bag supports 214 hold a portion of vacuum bag 208 above support structure 206. In some illustrative examples, number of morphable bag supports 214 is formed of flexible polymeric material 216.

In some illustrative examples, each of number of morphable bag supports 214 has a same design. In some illustrative examples, at least one of number of morphable bag supports 214 has a different design than another morphable bag support of number of morphable bag supports 214.

Each morphable bag support of number of morphable bag supports 214 comprises fingers separated by gaps, the fingers extending outwardly away from the vacuum bag. For example, first morphable bag support 224 comprises fingers 226 separated by gaps 228, fingers 226 extending outwardly away from vacuum bag 208. Second morphable bag support 230 comprises fingers 232 separated by gaps 234, fingers 232 extending outwardly away from vacuum bag 208.

Each morphable bag support of number of morphable bag supports 214 further comprises pressure chambers within the fingers connected by an internal channel. For example, first morphable bag support 224 comprises pressure chambers 236 within fingers 226 connected by internal channel 238. Second morphable bag support 230 comprises pressure chambers 240 within fingers 232 connected by internal channel 242.

Number of morphable bag supports 214 are actuated between engaged state 220 and retracted state 218 by modifying pressure within the pressure chambers of number of morphable bag supports 214. For example, first pressure source 244 is connected to pressure input 246 of first morphable bag support 224. First pressure source 244 can provide either vacuum 248 or positive pressure 250.

When first pressure source 244 provides vacuum 248 to pressure chambers 236 of first morphable bag support 224, first morphable bag support 224 is in retracted state 218. When first pressure source 244 provides positive pressure 250 to pressure chambers 236 of first morphable bag support 224, first morphable bag support 224 is in engaged state 220.

Second pressure source 252 is connected to pressure input 254 of second morphable bag support 230. second pressure source 252 can provide either vacuum 256 or positive pressure 258.

When second pressure source 252 provides vacuum 256 to pressure chambers 240 of second morphable bag support 230, second morphable bag support 230 is in retracted state 218. When first pressure source 244 provides positive pressure 258 to pressure chambers 240 of second morphable bag support 230, second morphable bag support 230 is in engaged state 220.

In some illustrative examples, each of number of morphable bag supports 214 is independently controlled. For example, first morphable bag support 224 is controlled independently of second morphable bag support 230.

A rate of contraction of first morphable bag support 224 is controlled by at least one of pressure supplied by first pressure source 244, width 260 of gaps 228, and height 262 of fingers 226. Height 262 limits contraction of first morphable bag support 224. Increasing height 262 reduces the contraction of first morphable bag support 224. Increasing width 260 of gaps 228 allows for more movement of first morphable bag support 224. Moment of inertia of first morphable bag support 224 is improved with increased height 262. Flexibility of first morphable bag support 224 is increased with decreased height 262.

In some illustrative examples, height 262 is consistent for fingers 226. In some illustrative examples, height 262 varies for fingers 226. In some illustrative examples, pressure chambers 236 are the same size and shape. In some illustrative examples, at least one pressure chamber of pressure chambers 236 can have a different size and shape.

A rate of contraction of second morphable bag support 230 is controlled by at least one of pressure supplied by second pressure source 252, width 266 of gaps 234, and height 268 of fingers 232. Height 268 limits contraction of second morphable bag support 230. Increasing height 268 reduces the contraction of second morphable bag support 230. Increasing width 266 of gaps 234 allows for more movement of second morphable bag support 230. Moment of inertia of second morphable bag support 230 is improved with increased height 268. Flexibility of second morphable bag support 230 is increased with decreased height 268.

In some illustrative examples, height 268 is consistent for fingers 232. In some illustrative examples, height 268 varies for fingers 232. In some illustrative examples, pressure chambers 240 are the same size and shape. In some illustrative examples, at least one pressure chamber of pressure chambers 240 can have a different size and shape.

Fingers 226 extend outwardly from base 270. Base 270 of first morphable bag support 224 is connected to support face 212 of vacuum bag 208. In some illustrative examples, each of number of morphable bag supports 214 is connected to support face 212 on periphery 272 of vacuum bag 208. In some illustrative examples, first morphable bag support 224 is connected to first side 274 of support face 212.

Fingers 232 extend outwardly from base 276. Base 276 of second morphable bag support 230 is connected to support face 212 of vacuum bag 208. In some illustrative examples, second morphable bag support 230 is connected to second side 278 of support face 212.

In this illustrative example, number of morphable bag supports 214 comprises first morphable bag support 224 connected to first side 274 of support face 212 and second morphable bag support 230 connected to second side 278 of support face 212 such that four corners 222 of vacuum bag 208 are movable by actuating first morphable bag support 224 and second morphable bag support 230. In some illustrative examples, number of morphable bag supports 214 further comprises other morphable bag supports not depicted in FIG. 2. In some illustrative examples, number of morphable bag supports 214 further comprises a third morphable bag support (not depicted) connected to third side 284 of support face 212 connecting first side 274 and second side 278 and a fourth morphable bag support (not depicted) connected to fourth side 286 of support face 212 connecting first side 274 and second side 278.

Number of morphable bag supports 214 are utilized for supporting vacuum bag 208 of composite compaction system 200 to place composite compaction system 200 on support structure 206. Number of morphable bag supports 214 are utilized to conform vacuum bag 208 to support structure 206 prior to compacting material 203.

Composite compaction system 200 further comprises vacuum interface structure 280 configured to control vacuum 281 supplied to vacuum bag 208 for compaction 283 of material 203. Compaction pressure source 282 provides pressure control to vacuum interface structure 280 independently of pressure control on number of morphable bag supports 214. In some illustrative examples, vacuum interface structure 280 is centered relative to support face 212 of vacuum bag 208.

Composite compaction system 200 further comprises rigid support 288 connected to vacuum interface structure 280 and number of morphable bag supports 214. Although one rigid support, rigid support 288 is depicted, any desirable quantity of rigid supports is present to connect number of morphable bag supports 214 to vacuum interface structure 280.

As depicted, composite compaction system 200 comprises number of pressure sources 290 having a quantity equivalent to a quantity of morphable bag supports in number of morphable bag supports 214 such that a single morphable bag support of number of morphable bag supports 214 is connected to each pressure source of number of pressure sources 290. In other non-depicted illustrative examples, number of pressure sources 290 can have a quantity less than the quantity of morphable bag supports in number of morphable bag supports 214. In these illustrative examples, independently controlled valves can be used to allow more than one morphable bag support to be connected to a single pressure source and also individually controlled.

The illustration of manufacturing environment 202 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, more than two morphable bag supports can be present in number of morphable bag supports 214. As another example, more than one rigid support can be present.

Figure 3:
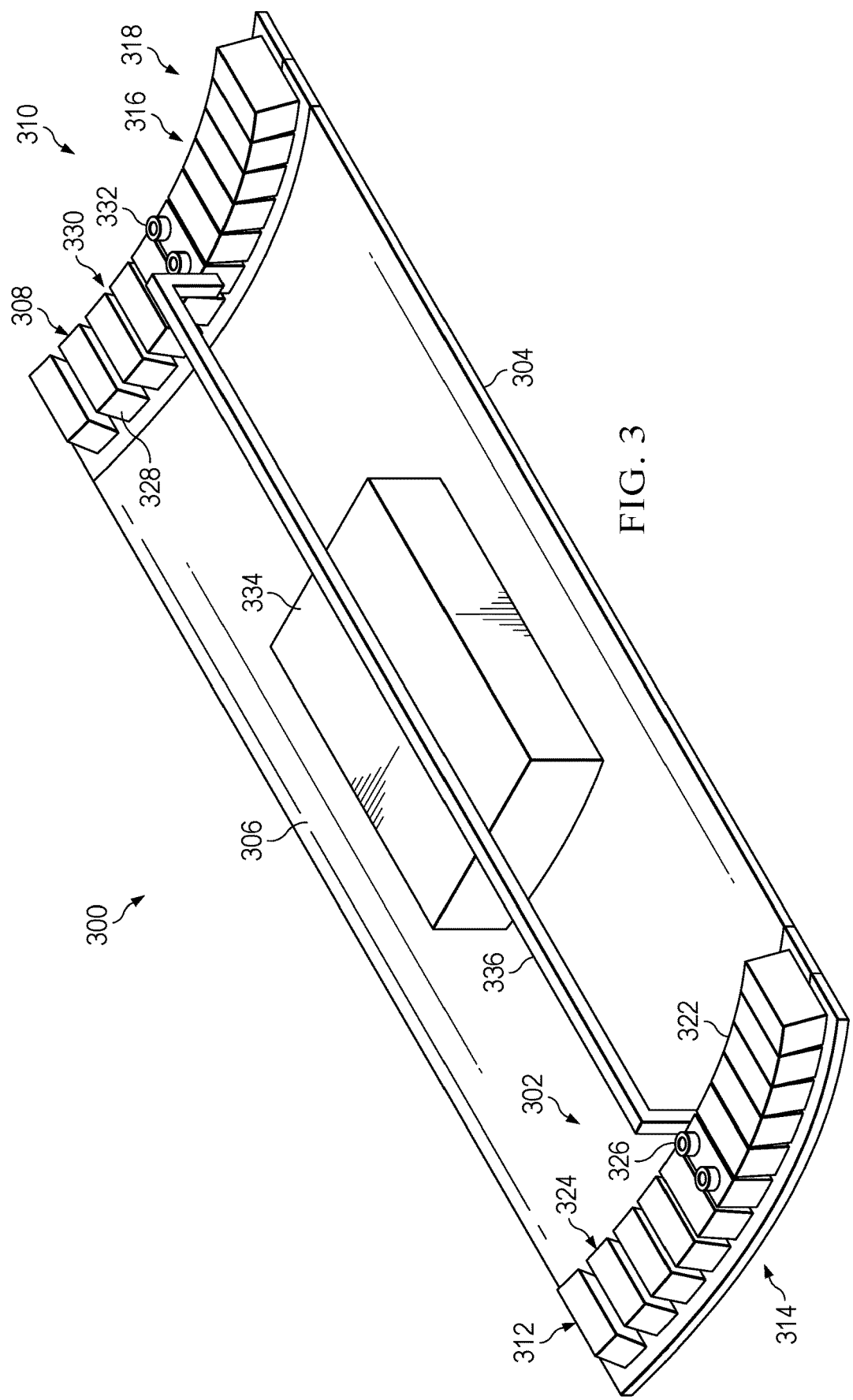
FIG. 3 is an illustration of a composite compaction system with a number of morphable bag supports in a retracted state in accordance with an illustrative embodiment.

Turning now to FIG. 3, an illustration of a composite compaction system with a number of morphable bag supports in a retracted state is depicted in accordance with an illustrative embodiment. Composite compaction system 300 is a physical implementation of composite compaction system 200 of FIG. 2. Composite compaction system 300 can be used to form a portion of aircraft 100 of FIG. 1.

Composite compaction system 300 comprises vacuum bag 302 and number of morphable bag supports 308. Vacuum bag 302 has contact face 304 and support face 306 opposite contact face 304. In some illustrative examples, contact face 304 is configured to contact a composite material (not depicted). Number of morphable bag supports 308 is formed of a flexible polymeric material connected to support face 306 and configured to morph between retracted state 310 and an engaged state (not depicted).

In this illustrative example, number of morphable bag supports 308 comprises first morphable bag support 312 connected to first side 314 of support face 306 and second morphable bag support 316 connected to second side 318 of support face 306 such that four corners of vacuum bag 302 are movable by actuating first morphable bag support 312 and second morphable bag support 316. Each morphable bag support of number of morphable bag supports 308 comprises fingers separated by gaps, the fingers extending outwardly away from vacuum bag 302.

As depicted, first morphable bag support 312 comprises fingers 322 separated by gaps 324. Pressure chambers (not depicted) within fingers 322 are connected by an internal channel (not depicted). Pressure supplied to pressure ports 326 control pressure supplied to the pressure chambers (not depicted) within fingers 322. Application of pressure to the pressure chambers controls the position of first morphable bag support 312. Application of positive pressure to the pressure chambers via pressure ports 326 changes first morphable bag support 312 between retracted state 310 and an engaged state (not depicted).

As depicted, second morphable bag support 316 comprises fingers 328 separated by gaps 330. Pressure chambers (not depicted) within fingers 328 are connected by an internal channel (not depicted). Pressure supplied to pressure ports 332 control pressure supplied to the pressure chambers (not depicted) within fingers 328. Application of pressure to the pressure chambers controls the position of second morphable bag support 316. Application of positive pressure to the pressure chambers via pressure ports 332 changes second morphable bag support 316 between retracted state 310 and an engaged state (not depicted).

Composite compaction system 300 further comprises vacuum interface structure 334. Vacuum interface structure 334 is configured to control vacuum supplied to vacuum bag 302 for compaction of a composite material. Vacuum is supplied to vacuum interface structure 334 independently of pressure supplied to number of morphable bag supports 308.

In this illustrative example, rigid support 336 is connected to vacuum interface structure 334 and number of morphable bag supports 308. Rigid support 336 provides structure to composite compaction system 300.

Figure 4:
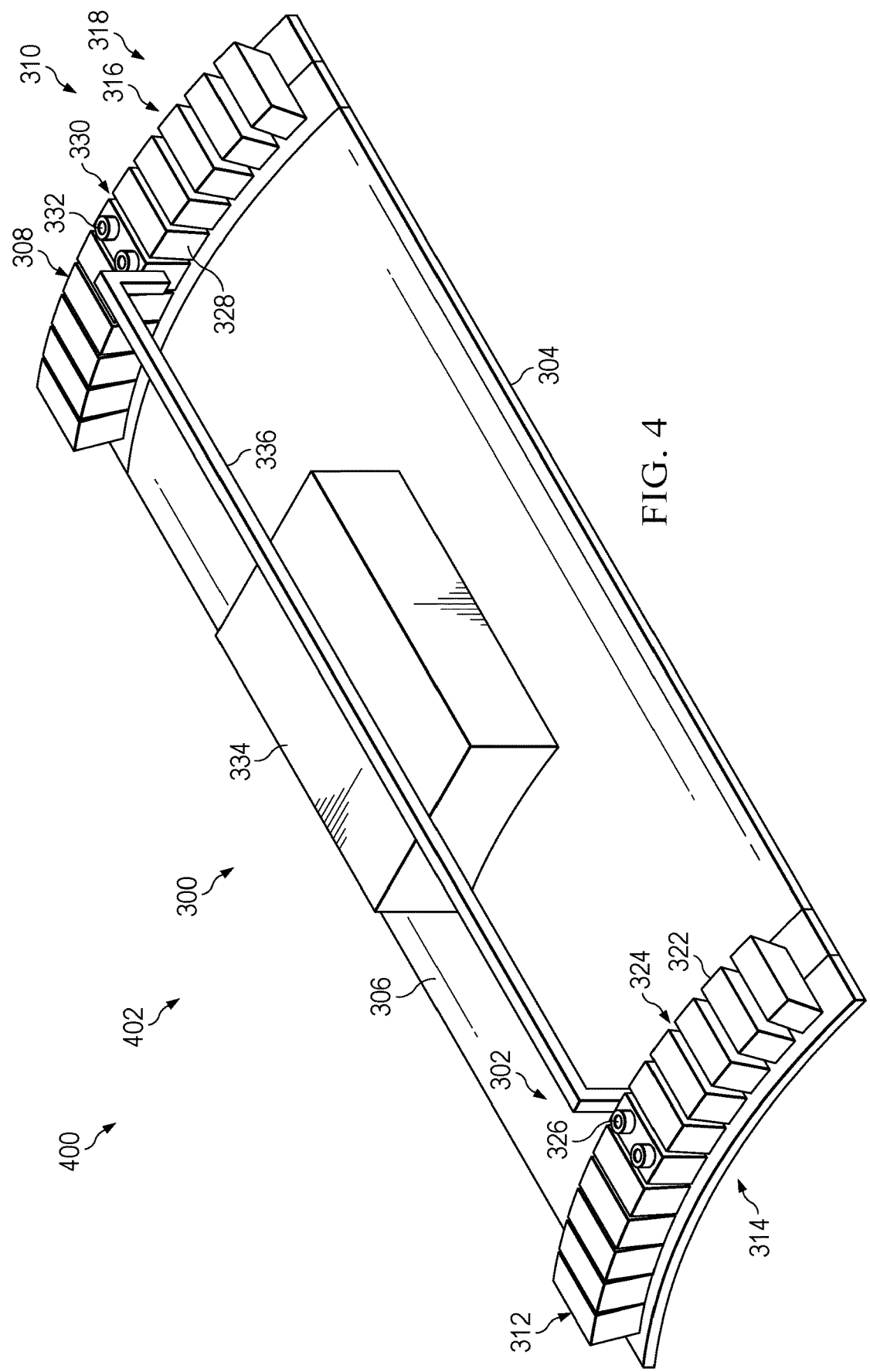
FIG. 4 is an illustration of a composite compaction system with a number of morphable bag supports in an engaged state in accordance with an illustrative embodiment.

Turning now to FIG. 4, an illustration of a composite compaction system with a number of morphable bag supports in an engaged state is depicted in accordance with an illustrative embodiment. View 400 is a view of composite compaction system 300 of FIG. 3 with number of morphable bag supports 308 in engaged state 402. In engaged state 402, number of morphable bag supports 308 are shaped such that vacuum bag 302 is configured to contact a surface of an object (not depicted).

Figure 5:
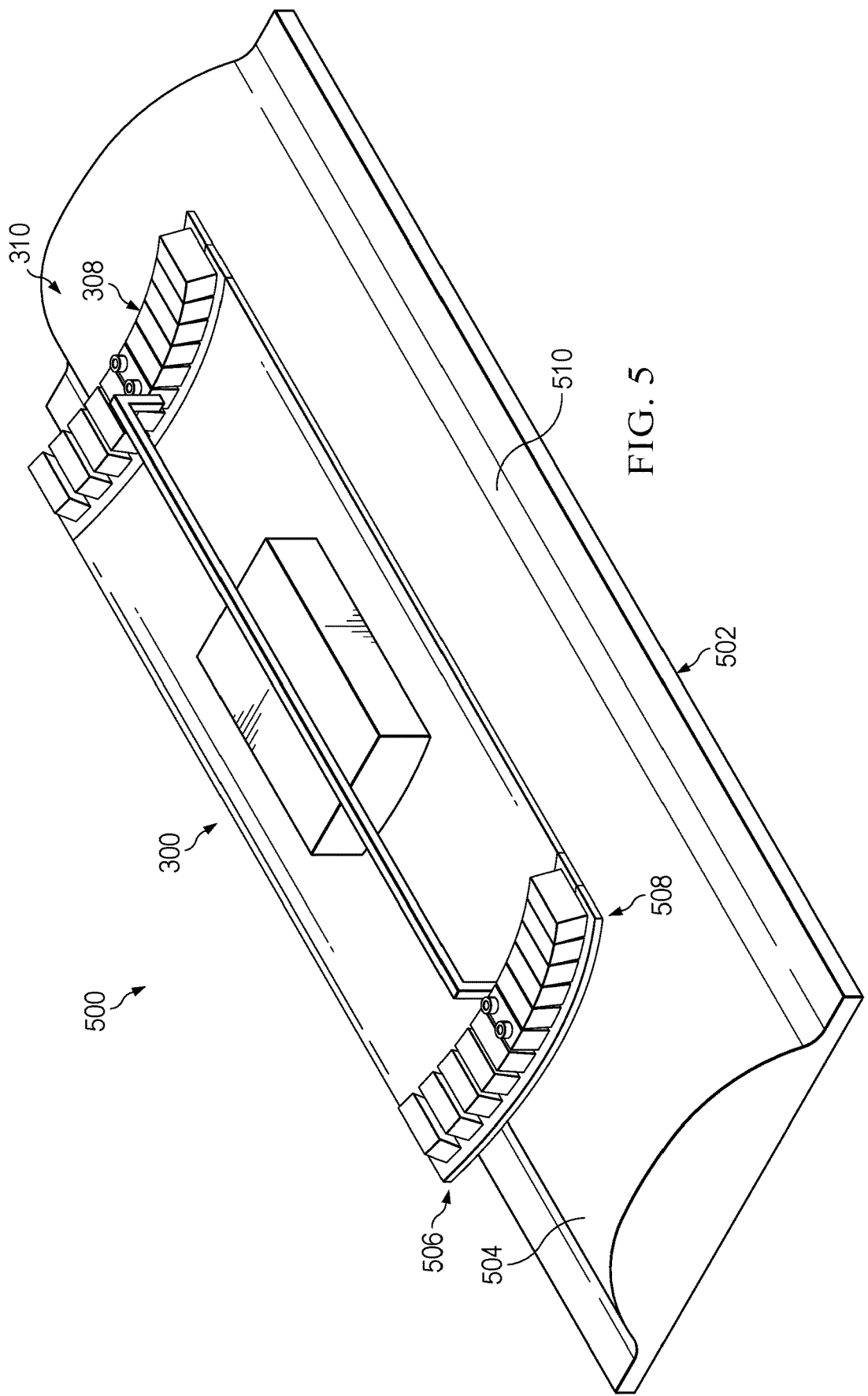
FIG. 5 is an illustration of a composite compaction system with a number of morphable bag supports in a retracted state against an object in accordance with an illustrative embodiment.

Turning now to FIG. 5, an illustration of a composite compaction system with a number of morphable bag supports in a retracted state against an object is depicted in accordance with an illustrative embodiment. View 500 is an isometric side view of composite compaction system 300 in contact with object 502 while number of morphable bag supports 308 is in retracted state 310. In view 500, only a portion of vacuum bag 302 is in contact with surface 504 of object 502.

In view 500, corner 506 and corner 508 of vacuum bag 302 are lifted off of object 502. In view 500, retracted state 310 reduces wrinkling of vacuum bag 302 when positioning composite compaction system 300 against object 502.

In view 500, a vacuum is applied to number of morphable bag supports 308 in order to lift corner 506 and corner 508 of vacuum bag 302. Composite compaction system 300 is transferred with number of morphable bag supports 308 in retracted state 310 and placed over object 502.

In view 500, surface 504 of object 502 is a contoured surface. It would be undesirably difficult to apply a rigidly supported structure to contour 510 of surface 504. Number of morphable bag supports 308 allows for composite compaction system 300 to engage surface 504 of object 502, as shown in FIG. 6 below.

Figure 6:
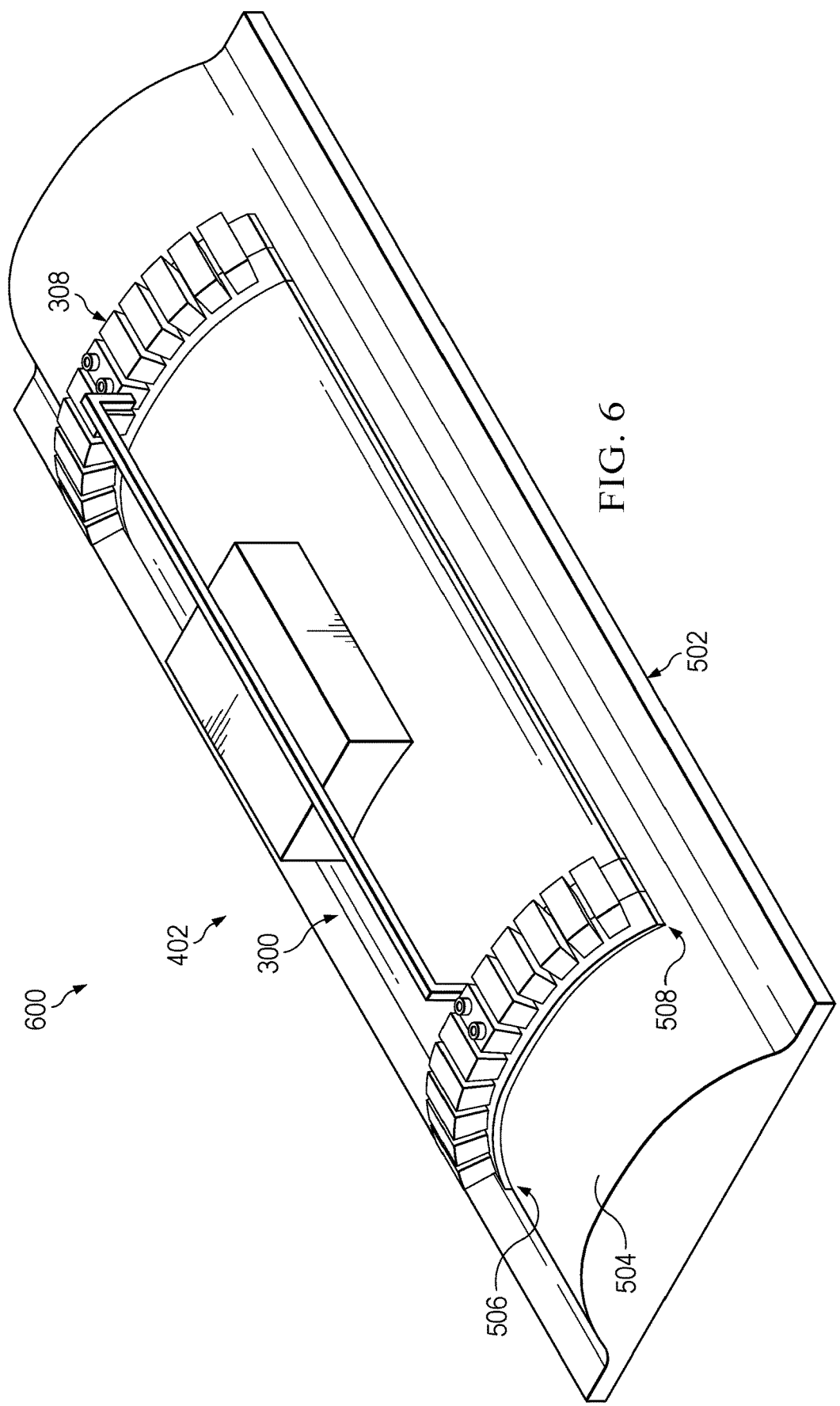
FIG. 6 is an illustration of a composite compaction system with a number of morphable bag supports in an engaged state against an object in accordance with an illustrative embodiment.

Turning now to FIG. 6, an illustration of a composite compaction system with a number of morphable bag supports in an engaged state against an object is depicted in accordance with an illustrative embodiment. In view 600, composite compaction system 300 is positioned with vacuum bag 302 against object 502. In view 600, number of morphable bag supports 308 is in engaged state 402. In view 600 corner 506 and corner 508 of vacuum bag 302 are in contact with surface 504 of object 502. Vacuum bag 302 is positioned against object 502 with reduced wrinkling due to number of morphable bag supports 308.

Between view 500 and view 600, the vacuum has been released from number of morphable bag supports 308. Afterwards, positive pressure is applied to number of morphable bag supports 308 to conform vacuum bag 302 to surface 504 of object 502. In some illustrative examples, the positive pressure takes the form of compressed air. Number of morphable bag supports 308 provide adequate support and seating when conforming to the shape of surface 504.

Figure 7:
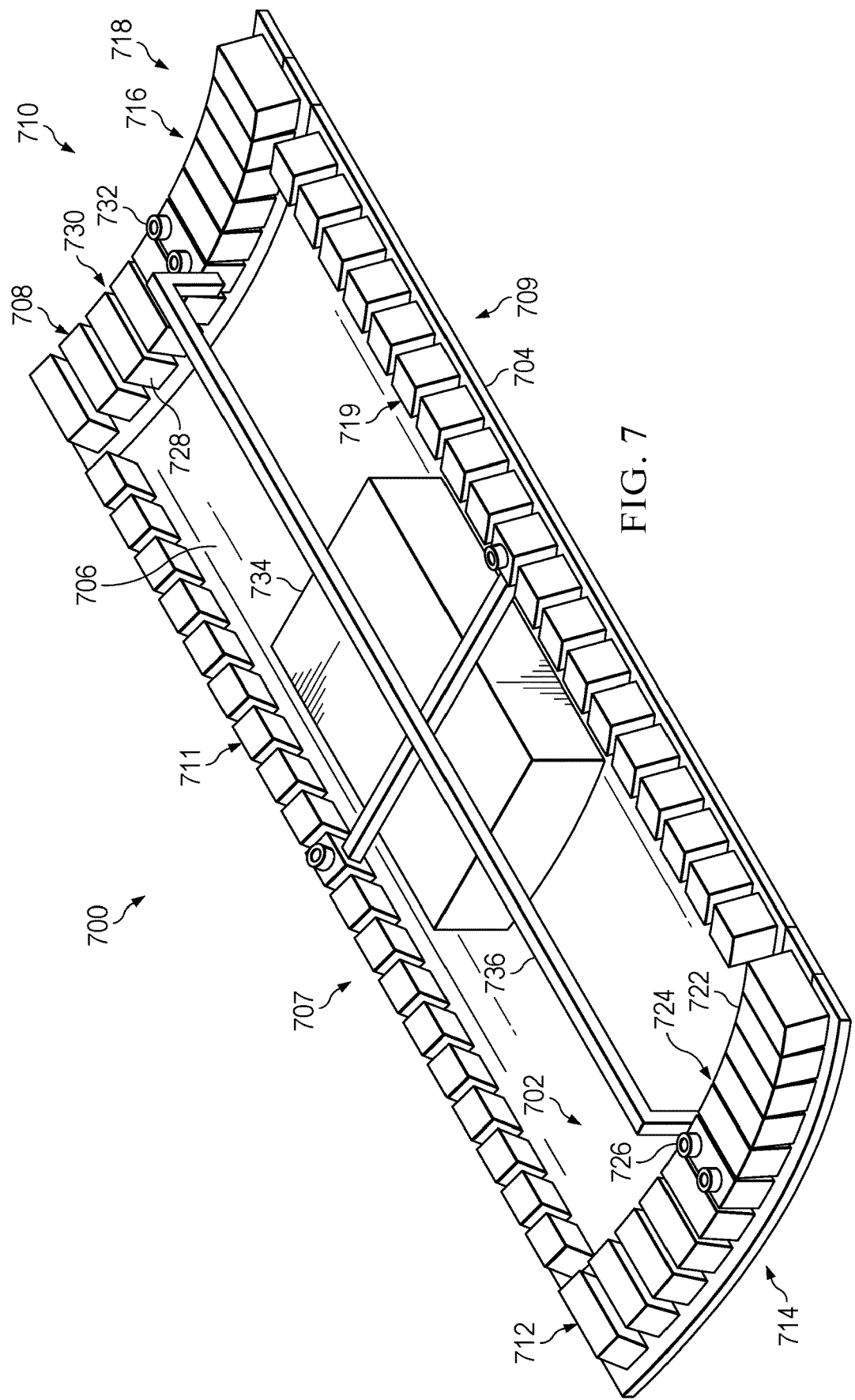
FIG. 7 is an illustration of a composite compaction system with a number of morphable bag supports in a retracted state in accordance with an illustrative embodiment.

Turning now to FIG. 7, an illustration of a composite compaction system with a number of morphable bag supports in a retracted state is depicted in accordance with an illustrative embodiment. Composite compaction system 700 is a physical implementation of composite compaction system 200 of FIG. 2. Composite compaction system 700 can be used to form a portion of aircraft 100 of FIG. 1.

Composite compaction system 700 comprises vacuum bag 702 and number of morphable bag supports 708. Vacuum bag 702 has contact face 704 and support face 706 opposite contact face 704. In some illustrative examples, contact face 704 is configured to contact a composite material (not depicted). Number of morphable bag supports 708 is formed of a flexible polymeric material connected to support face 706 and configured to morph between retracted state 710 and an engaged state (not depicted).

In this illustrative example, number of morphable bag supports 708 comprises first morphable bag support 712 connected to first side 714 of support face 706, second morphable bag support 716 connected to second side 718 of support face 706, third morphable bag support 711 connected to third side 707 of support face 706, and fourth morphable bag support 719 connected to fourth side 709 of support face 706 such that four corners of vacuum bag 702 are movable by actuating number of morphable bag supports 708. Each morphable bag support of number of morphable bag supports 708 comprises fingers separated by gaps, the fingers extending outwardly away from vacuum bag 702.

As depicted, first morphable bag support 712 comprises fingers 722 separated by gaps 724. Pressure chambers (not depicted) within fingers 722 are connected by an internal channel (not depicted). Pressure supplied to pressure ports 726 control pressure supplied to the pressure chambers (not depicted) within fingers 722. Application of pressure to the pressure chambers controls the position of first morphable bag support 712. Application of positive pressure to the pressure chambers via pressure ports 726 changes first morphable bag support 712 between retracted state 710 and an engaged state (not depicted).

As depicted, second morphable bag support 716 comprises fingers 728 separated by gaps 730. Pressure chambers (not depicted) within fingers 728 are connected by an internal channel (not depicted). Pressure supplied to pressure ports 732 control pressure supplied to the pressure chambers (not depicted) within fingers 728. Application of pressure to the pressure chambers controls the position of second morphable bag support 716. Application of positive pressure to the pressure chambers via pressure ports 732 changes second morphable bag support 716 between retracted state 710 and an engaged state (not depicted).

As depicted, third morphable bag support 711 comprises fingers 713 separated by gaps 715. Pressure chambers (not depicted) within fingers 713 are connected by an internal channel (not depicted). Pressure supplied to pressure ports 717 control pressure supplied to the pressure chambers (not depicted) within fingers 713. Application of pressure to the pressure chambers controls the position of third morphable bag support 711. Application of positive pressure to the pressure chambers via pressure ports 717 changes third morphable bag support 711 between retracted state 710 and an engaged state (not depicted).

As depicted, fourth morphable bag support 719 comprises fingers 721 separated by gaps 723. Pressure chambers (not depicted) within fingers 721 are connected by an internal channel (not depicted). Pressure supplied to pressure ports 725 control pressure supplied to the pressure chambers (not depicted) within fingers 721. Application of pressure to the pressure chambers controls the position of fourth morphable bag support 719. Application of positive pressure to the pressure chambers via pressure ports 725 changes fourth morphable bag support 719 between retracted state 710 and an engaged state (not depicted).

Composite compaction system 700 further comprises vacuum interface structure 734. Vacuum interface structure 734 is configured to control vacuum supplied to vacuum bag 702 for compaction of a composite material. Vacuum is supplied to vacuum interface structure 734 independently of pressure supplied to number of morphable bag supports 708.

In this illustrative example, rigid support 736 is connected to vacuum interface structure 734, first morphable bag support 712 and second morphable bag support 716. Rigid support 736 provides structure to composite compaction system 700. In this illustrative example, rigid support 736 is connected to vacuum interface structure 734, third morphable bag support 711, and fourth morphable bag support 719. Rigid support 736 provides structure to composite compaction system 700.

Figure 8:
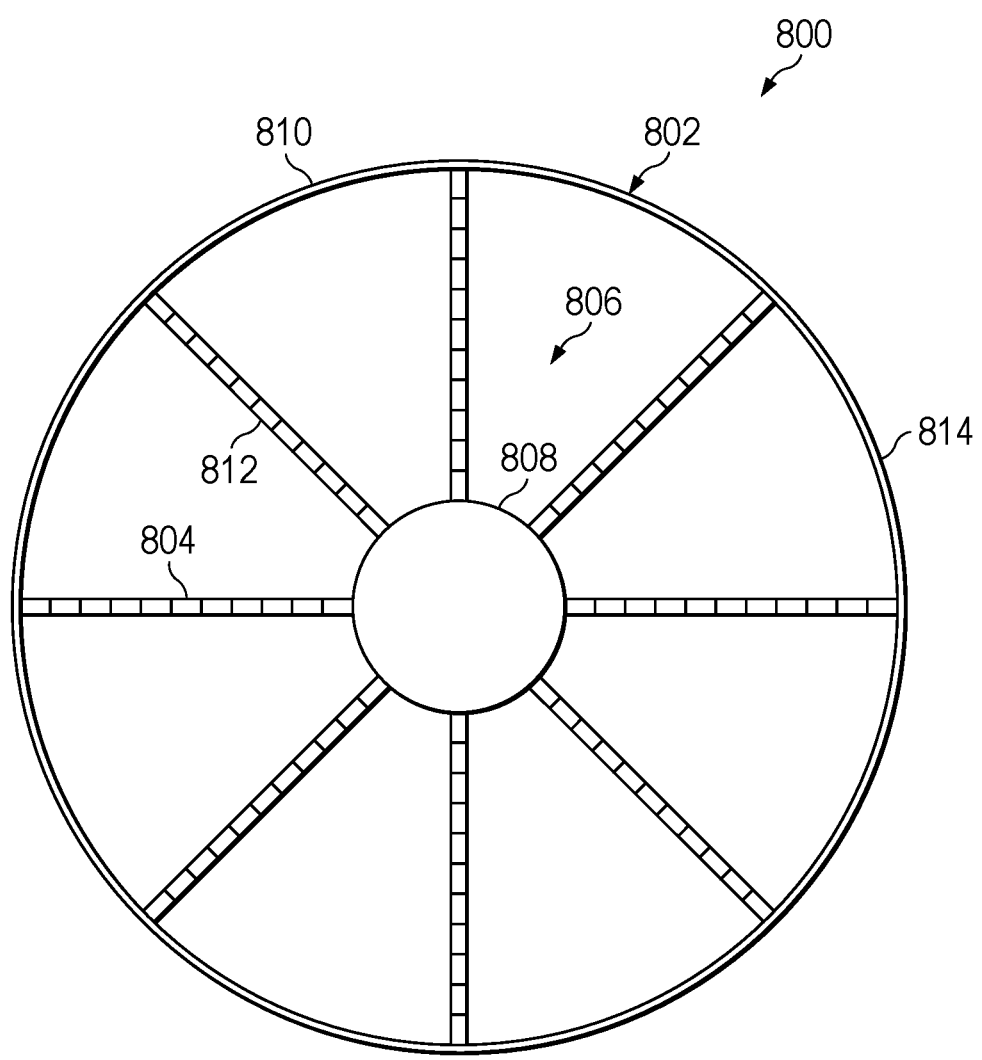
FIG. 8 is an illustration of a top view of a composite compaction system with a number of morphable bag supports in accordance with an illustrative embodiment.

Turning now to FIG. 8, an illustration of a top view of a composite compaction system with a number of morphable bag supports is depicted in accordance with an illustrative embodiment. Composite compaction system 800 is a physical implementation of composite compaction system 200 of FIG. 2. Composite compaction system 800 can be used to form a portion of aircraft 100 of FIG. 1.

Composite compaction system 800 comprises vacuum bag 802 and number of morphable bag supports 804. Vacuum bag 802 has contact face (not depicted) and support face 806 opposite the contact face. In some illustrative examples, the contact face is configured to contact a composite material (not depicted). Number of morphable bag supports 804 is formed of a flexible polymeric material connected to support face 806 and configured to morph between a retracted state and an engaged state.

Each morphable bag support of number of morphable bag supports 804 comprises fingers separated by gaps, the fingers extending outwardly away from vacuum bag 802. Pressure chambers of each morphable bag support of number of morphable bag supports 804 are connected by a respective internal channel (not depicted). Pressure supplied to pressure ports of number of morphable bag supports 804 controls pressure supplied to the pressure chambers (not depicted) within the respective fingers. Application of pressure to the respective pressure chambers controls the position of a respective morphable bag support of number of morphable bag supports 804. Application of positive pressure to respective pressure chambers via pressure ports changes a respective morphable bag support between a retracted state and an engaged state.

Composite compaction system 800 further comprises vacuum interface structure 808. Vacuum interface structure 808 is configured to control vacuum supplied to vacuum bag 802 for compaction of a composite material. Vacuum is supplied to vacuum interface structure 808 independently of pressure supplied to number of morphable bag supports 804.

In this illustrative example, vacuum bag 802 is circular 810. In this illustrative example, number of morphable bag supports 804 are connected to vacuum interface structure 808. In this illustrative example, number of morphable bag supports 804 are laid out radially 812 from vacuum interface structure 808.

In this illustrative example, although number of morphable bag supports 804 comprises eight morphable bag supports, any desirable quantity of morphable bag supports can be present. In some illustrative examples, number of morphable bag supports 804 can have fewer than eight morphable bag supports. In some illustrative examples, number of morphable bag supports 804 can have more than eight morphable bag supports.

In this illustrative example, number of morphable bag supports 804 extends from vacuum interface structure 808 to edge 814 of vacuum bag 802. In some other non-depicted illustrative examples, number of morphable bag supports 804 terminates prior to edge 814 of vacuum bag 802. In this illustrative example, each of number of morphable bag supports 804 has a same length. In other non-depicted illustrative examples, at least one morphable bag support of number of morphable bag supports 804 has a different length than other morphable bag supports in number of morphable bag supports 804.

Figure 9:
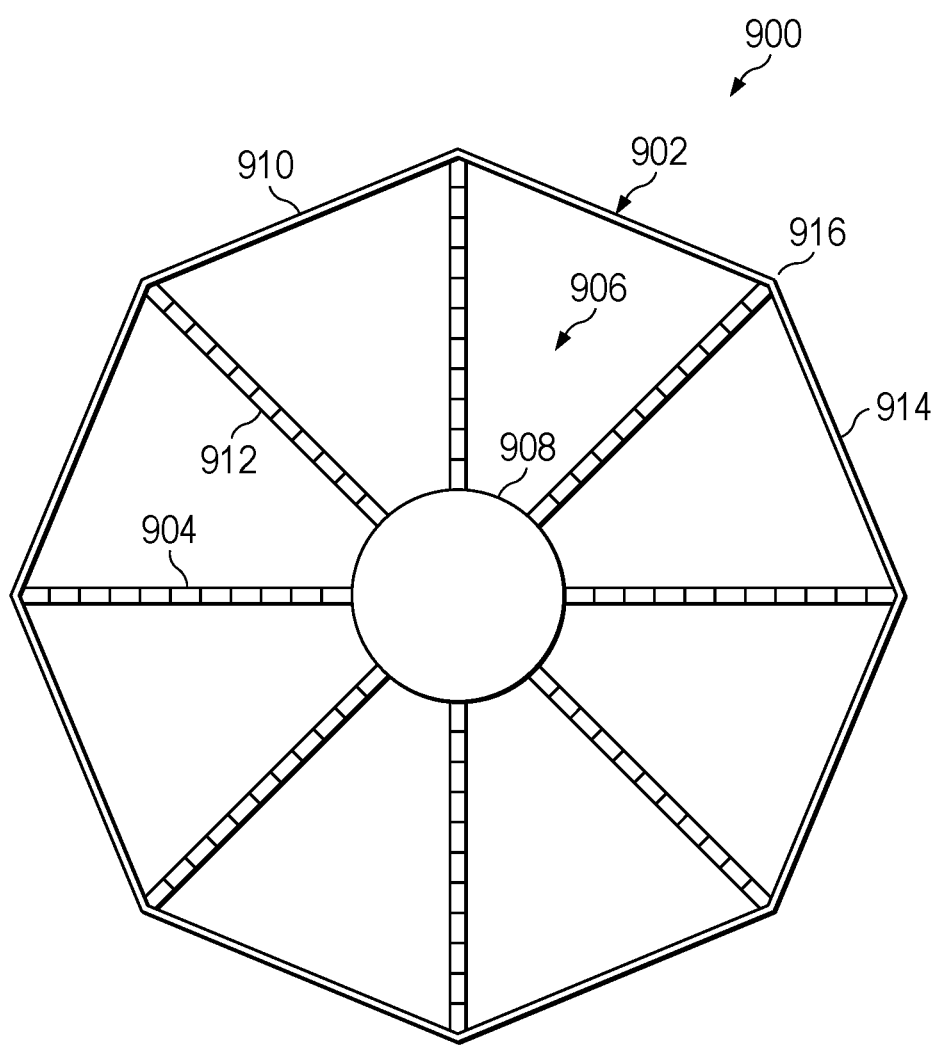
FIG. 9 is an illustration of a top view of a composite compaction system with a number of morphable bag supports in accordance with an illustrative embodiment.

Turning now to FIG. 9, an illustration of a top view of a composite compaction system with a number of morphable bag supports is depicted in accordance with an illustrative embodiment. Composite compaction system 900 is a physical implementation of composite compaction system 200 of FIG. 2. Composite compaction system 900 can be used to form a portion of aircraft 100 of FIG. 1.

Composite compaction system 900 comprises vacuum bag 902 and number of morphable bag supports 904. Vacuum bag 902 has contact face (not depicted) and support face 906 opposite the contact face. In some illustrative examples, the contact face is configured to contact a composite material (not depicted). Number of morphable bag supports 904 is formed of a flexible polymeric material connected to support face 906 and configured to morph between a retracted state and an engaged state.

Each morphable bag support of number of morphable bag supports 904 comprises fingers separated by gaps, the fingers extending outwardly away from vacuum bag 902. Pressure chambers of each morphable bag support of number of morphable bag supports 904 are connected by a respective internal channel (not depicted). Pressure supplied to pressure ports of number of morphable bag supports 904 controls pressure supplied to the pressure chambers (not depicted) within the respective fingers. Application of pressure to the respective pressure chambers controls the position of a respective morphable bag support of number of morphable bag supports 904. Application of positive pressure to respective pressure chambers via pressure ports changes a respective morphable bag support between a retracted state and an engaged state.

Composite compaction system 900 further comprises vacuum interface structure 908. Vacuum interface structure 908 is configured to control vacuum supplied to vacuum bag 902 for compaction of a composite material. Vacuum is supplied to vacuum interface structure 908 independently of pressure supplied to number of morphable bag supports 904.

In this illustrative example, vacuum bag 902 is octagonal 910. In this illustrative example, number of morphable bag supports 904 are connected to vacuum interface structure 908. In this illustrative example, number of morphable bag supports 904 are laid out radially 912 from vacuum interface structure 908.

In this illustrative example, although number of morphable bag supports 904 comprises eight morphable bag supports, any desirable quantity of morphable bag supports can be present. In some illustrative examples, number of morphable bag supports 904 can have fewer than eight morphable bag supports. In some illustrative examples, number of morphable bag supports 904 can have more than eight morphable bag supports.

In this illustrative example, number of morphable bag supports 904 extends from vacuum interface structure 908 to edge 914 of vacuum bag 902. In this illustrative example, number of morphable bag supports 904 extends from vacuum interface structure 908 to number of corners 916 of vacuum bag 902. In some other non-depicted illustrative examples, number of morphable bag supports 904 terminates prior to edge 914 of vacuum bag 902. In this illustrative example, each of number of morphable bag supports 904 has a same length. In other non-depicted illustrative examples, at least one morphable bag support of number of morphable bag supports 904 has a different length than other morphable bag supports in number of morphable bag supports 904.

Figure 10:
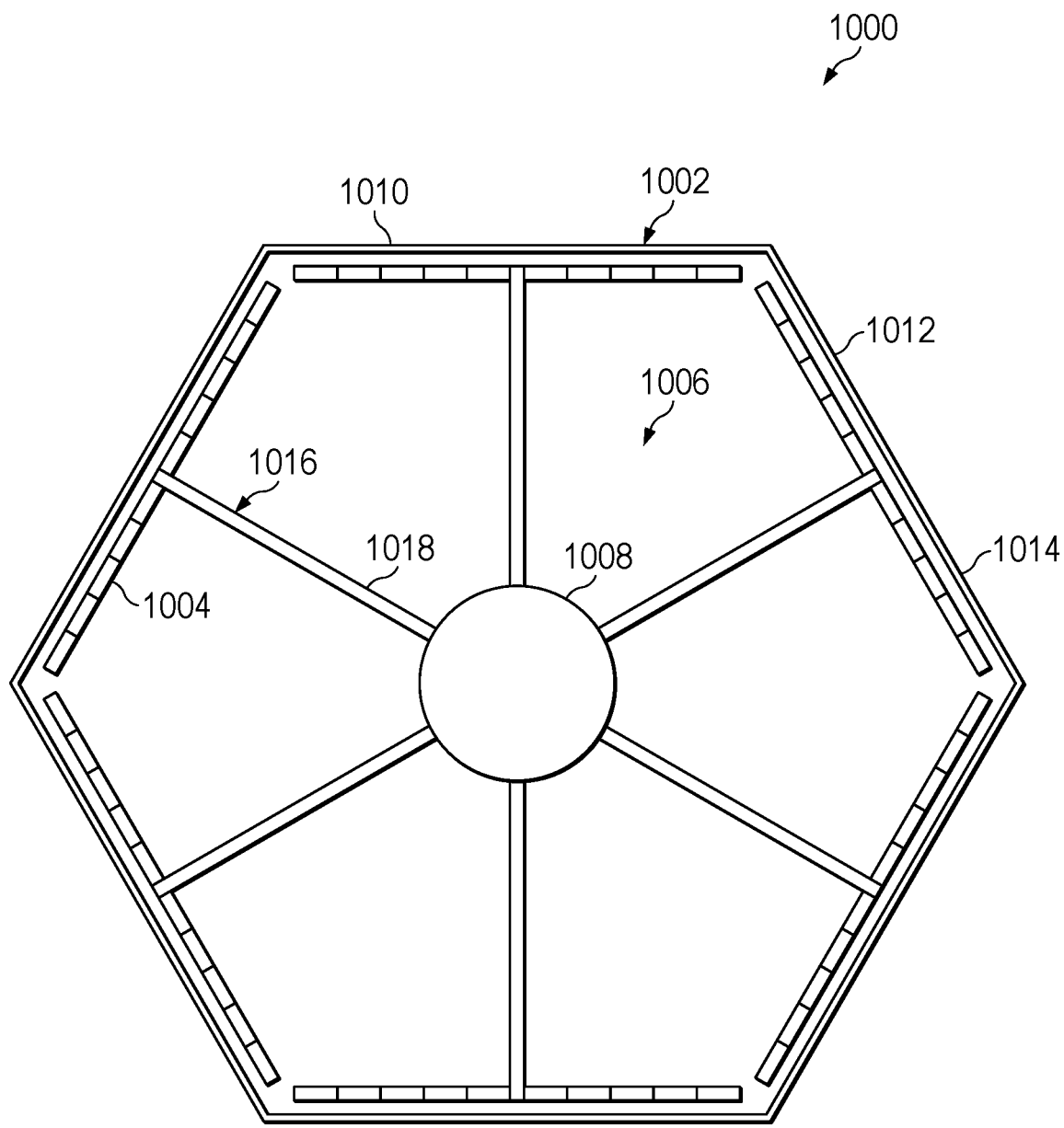
FIG. 10 is an illustration of a top view of a composite compaction system with a number of morphable bag supports in accordance with an illustrative embodiment.

Turning now to FIG. 10, an illustration of a top view of a composite compaction system with a number of morphable bag supports is depicted in accordance with an illustrative embodiment. Composite compaction system 1000 is a physical implementation of composite compaction system 200 of FIG. 2. Composite compaction system 1000 can be used to form a portion of aircraft 100 of FIG. 1.

Composite compaction system 1000 comprises vacuum bag 1002 and number of morphable bag supports 1004. Vacuum bag 1002 has contact face (not depicted) configured to contact a material (not depicted) and support face 1006 opposite contact face. Number of morphable bag supports 1004 is formed of a flexible polymeric material connected to support face 1006 and configured to morph between a retracted state and an engaged state.

Each morphable bag support of number of morphable bag supports 1004 comprises fingers separated by gaps, the fingers extending outwardly away from vacuum bag 1002. Pressure chambers of each morphable bag support of number of morphable bag supports 1004 are connected by a respective internal channel (not depicted). Pressure supplied to pressure ports of number of morphable bag supports 1004 controls pressure supplied to the pressure chambers (not depicted) within the respective fingers. Application of pressure to the respective pressure chambers controls the position of a respective morphable bag support of number of morphable bag supports 1004. Application of positive pressure to respective pressure chambers via pressure ports changes a respective morphable bag support between a retracted state and an engaged state.

Composite compaction system 1000 further comprises vacuum interface structure 1008. Vacuum interface structure 1008 is configured to control vacuum supplied to vacuum bag 1002 for compaction of a composite material. Vacuum is supplied to vacuum interface structure 1008 independently of pressure supplied to number of morphable bag supports 1004.

In this illustrative example, vacuum bag 1002 is hexagonal 1010. In this illustrative example, number of morphable bag supports 1004 is parallel to number of sides 1012 of edge 1014.

In this illustrative example, although number of morphable bag supports 1004 comprises six morphable bag supports, any desirable quantity of morphable bag supports can be present. In some illustrative examples, number of morphable bag supports 1004 can have fewer than six morphable bag supports. In some illustrative examples, three morphable bag supports are present in number of morphable bag supports 1004, parallel to alternating sides of number of sides 1012. In some illustrative examples, number of morphable bag supports 1004 can have more than six morphable bag supports.

In this illustrative example, number of rigid supports 1016 extend from vacuum interface structure 1008 to number of morphable bag supports 1004. In this illustrative example, number of rigid supports 1016 extend radially 1018 from vacuum interface structure 1008 to number of morphable bag supports 1004.

Figure 11:
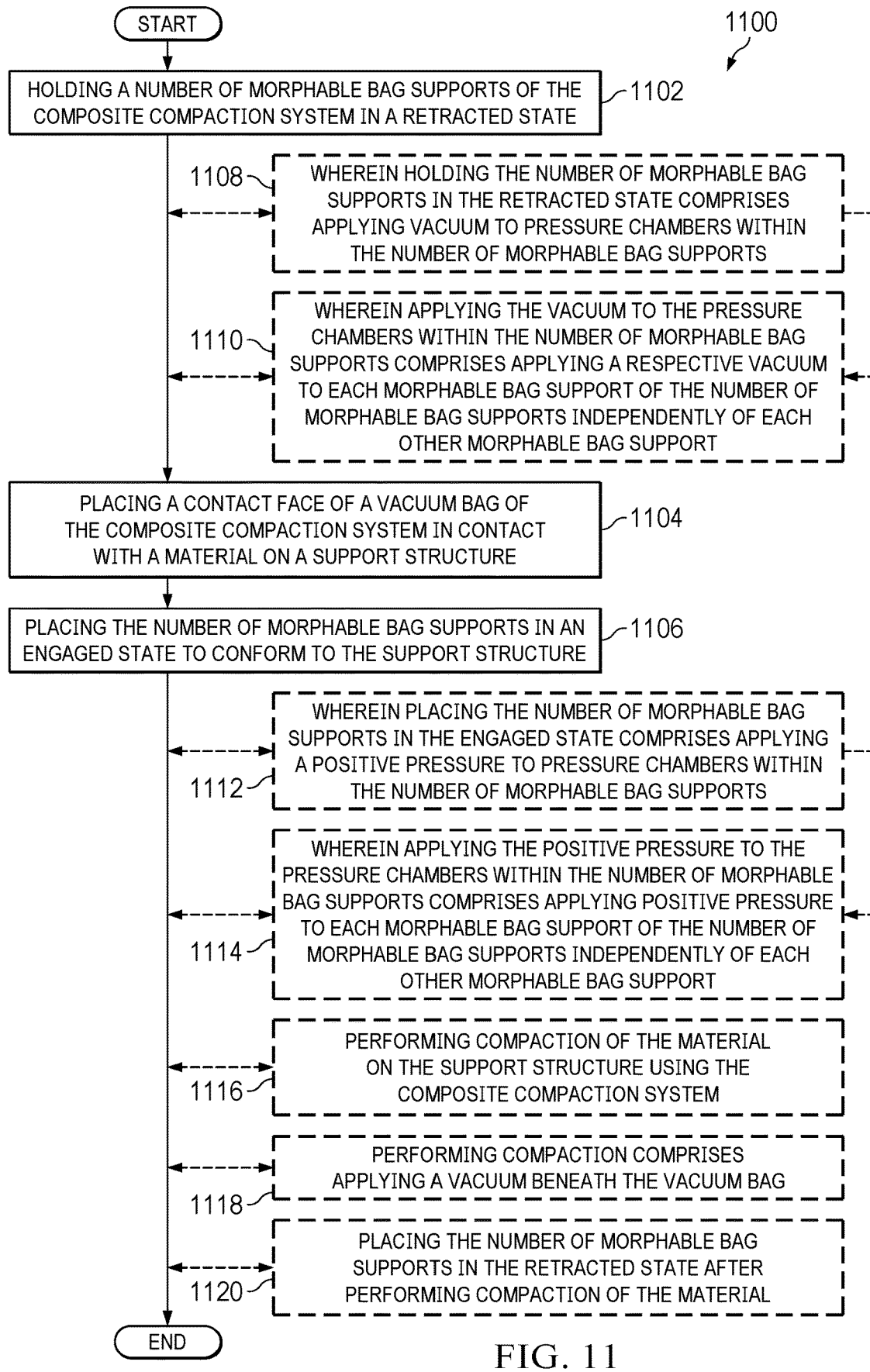
FIG. 11 is a flowchart of a method of supporting a composite compaction system in accordance with an illustrative embodiment.

Turning now to FIG. 11, a flowchart of a method of supporting a composite compaction system is depicted in accordance with an illustrative embodiment. Method 1100 can be used to process a composite portion of aircraft 100 of FIG. 1. Method 1100 can be performed using composite compaction system 200 of FIG. 2. Method 1100 can be performed using composite compaction system 300 of FIGS. 3-6. Method 1100 can be performed using composite compaction system 700 of FIG. 7.

Method 1100 holds a number of morphable bag supports of the composite compaction system in a retracted state (operation 1102). Method 1100 places a contact face of a vacuum bag of the composite compaction system in contact with a material on a support structure (operation 1104). Method 1100 places the number of morphable bag supports in an engaged state to conform to the support structure (operation 1106). Afterwards, method 1100 terminates.

In some illustrative examples, holding the number of morphable bag supports in the retracted state comprises applying vacuum to pressure chambers within the number of morphable bag supports (operation 1108). In some illustrative examples, applying the vacuum to the pressure chambers within the number of morphable bag supports comprises applying a respective vacuum to each morphable bag support of the number of morphable bag supports independently of each other morphable bag support (operation 1110).

In some illustrative examples, placing the number of morphable bag supports in the engaged state comprises applying a positive pressure to pressure chambers within the number of morphable bag supports (operation 1112). In some illustrative examples, applying the positive pressure to the pressure chambers within the number of morphable bag supports comprises applying positive pressure to each morphable bag support of the number of morphable bag supports independently of each other morphable bag support (operation 1114).

In some illustrative examples, method 1100 further comprises performing compaction of the material on the support structure using the composite compaction system (operation 1116). In some illustrative examples, performing compaction comprises applying a vacuum beneath the vacuum bag (operation 1118).

In some illustrative examples, method 1100 places the number of morphable bag supports in the retracted state after performing compaction of the material (operation 1120). After placing the number of morphable bag supports in the retracted state, the composite compaction system can be lifted away from the composite material on the support structure.

As used herein, the phrase "at least one of," when used with a list of items, means different combinations of one or more of the listed items may be used and only one of each item in the list may be needed. For example, "at least one of item A, item B, or item C" may include, without limitation, item A, item A and item B, or item B. This example also may include item A, item B, and item C or item B and item C. Of course, any combinations of these items may be present. In other examples, "at least one of" may be, for example, without limitation, two of item A; one of item B; and ten of item C; four of item B and seven of item C; or other suitable combinations. The item may be a particular object, thing, or a category. In other words, at least one of means any combination items and number of items may be used from the list but not all of the items in the list are required.

As used herein, "a number of," when used with reference to items means one or more items.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram. Some blocks may be optional. For example, operation 1108 through operation 1120 may be optional.

Figure 12:
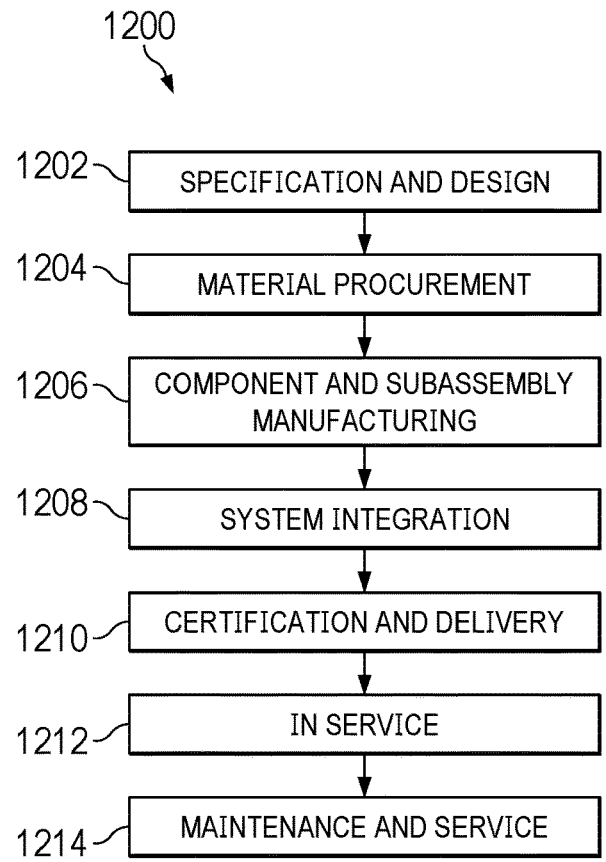
FIG. 12 is an illustration of an aircraft manufacturing and service method in a form of a block diagram in accordance with an illustrative embodiment.
Figure 13:
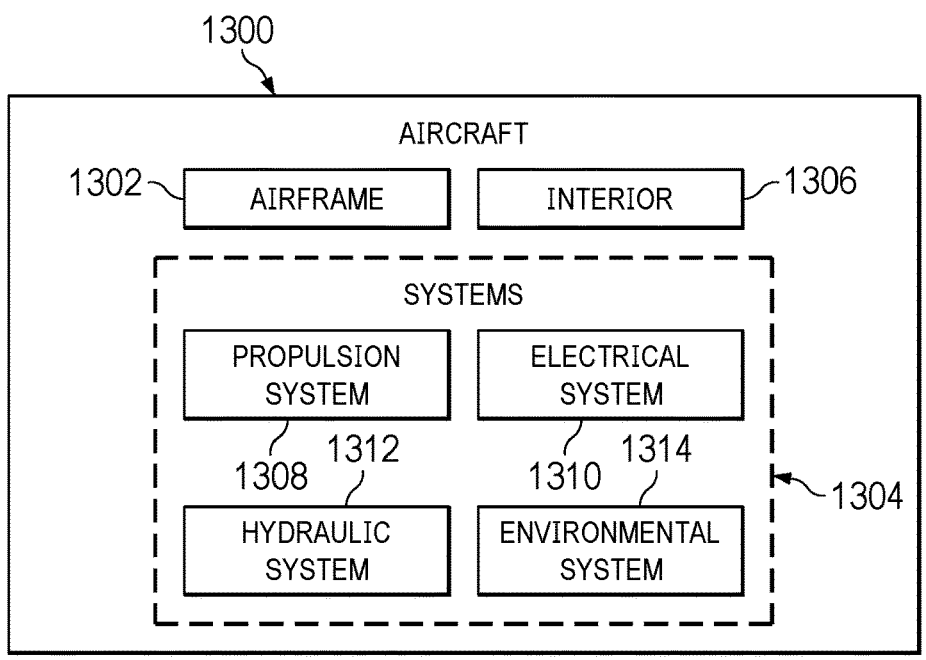
FIG. 13 is an illustration of an aircraft in a form of a block diagram in which an illustrative embodiment may be implemented.

Illustrative embodiments of the present disclosure may be described in the context of aircraft manufacturing and service method 1200 as shown in FIG. 12 and aircraft 1300 as shown in FIG. 13. Turning first to FIG. 12, an illustration of an aircraft manufacturing and service method in a form of a block diagram is depicted in accordance with an illustrative embodiment. During pre-production, aircraft manufacturing and service method 1200 may include specification and design 1202 of aircraft 1300 in FIG. 13 and material procurement 1204.

During production, component and subassembly manufacturing 1206 and system integration 1208 of aircraft 1300 takes place. Thereafter, aircraft 1300 may go through certification and delivery 1210 in order to be placed in service 1212. While in service 1212 by a customer, aircraft 1300 is scheduled for routine maintenance and service 1214, which may include modification, reconfiguration, refurbishment, or other maintenance and service.

Each of the processes of aircraft manufacturing and service method 1200 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 13, an illustration of an aircraft in a form of a block diagram is depicted in which an illustrative embodiment may be implemented. In this example, aircraft 1300 is produced by aircraft manufacturing and service method 1200 of FIG. 12 and may include airframe 1302 with plurality of systems 1304 and interior 1306. Examples of systems 1304 include one or more of propulsion system 1308, electrical system 1310, hydraulic system 1312, and environmental system 1314. Any number of other systems may be included.

Apparatuses and methods embodied herein may be employed during at least one of the stages of aircraft manufacturing and service method 1200. One or more illustrative embodiments may be manufactured or used during at least one of component and subassembly manufacturing 1206, system integration 1208, in service 1212, or maintenance and service 1214 of FIG. 12.

A portion of airframe 1302 of aircraft 1300 can be formed using method 1100. A portion of airframe 1302 of aircraft 1300 can be formed using composite compaction system 200 of FIG. 2. Method 1100 can be performed during component and subassembly manufacturing 1206. A composite structure formed using composite compaction system 200 can be present and utilized during in service 1212. Composite compaction system 200 can be used during maintenance and service 1214 to form a replacement part. Method 1100 can be used during maintenance and service 1214 to form a replacement part.

The illustrative examples provide an apparatus that enables automated and controlled manipulation, support, and seating of compaction films used on composite fabrication processes. The illustrative examples utilize morphable bag supports. The morphable bag supports are attached to the compaction film along the periphery, providing adequate support and seating when conforming to the shape of the surface. In some illustrative examples, morphable supports are attached to the compaction film along the entire periphery.

The illustrative examples utilize a long morphable support made of elastic material containing a series of consecutive air chambers connected with a small air channel. Applied air pressure allows the morphable support to be morphed in one direction with positive pressure and morphed in opposite direction with negative pressure.

The illustrative examples provide continuous support and manipulation of the compaction film while providing some compliance during seating. The technical features of the illustrative examples include compliance with the contoured surface, continuous support of the compaction film, and simplicity of the actuated mechanism.

These long elastic parts, referred to as morphable bag supports, are attached to the compaction film along the periphery, providing adequate support and seating when conforming to the shape of the surface.

The illustrative examples incorporate compliance with the contoured surface of the composite material, continuous support due to attachment to periphery of compaction bag, and simplicity of actuated mechanism. The elastic material of the morphable bag supports reduce the likeliness to crush or manipulate contour of composite material.

The illustrative examples apply vacuum to the number of morphable bag supports in order to lift corners of bag. The illustrative examples transfer and place a compaction device on a composite material. The illustrative examples release vacuum applied to the number of morphable bag supports. The illustrative examples apply positive pressure (can take the form of compressed air) to the number of morphable bag supports to conform the compaction bag to the composite material contoured surface. The illustrative examples apply initial vacuum to the compaction bag.

The illustrative examples provide continuous morphable support for an automated compaction bag. Through the use of positive and negative air pressure, the illustrative examples can manipulate orientation that will assist with retraction and seating of compaction bag.

Benefits of using the illustrative examples include increased quality. The illustrative examples minimize risk of insufficient compaction due to improved seating of bag. The illustrative examples minimize risk of undesirable effects to composite material due to elastic conformity to part.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of supporting a composite compaction system comprising: holding a number of morphable bag supports of the composite compaction system in a retracted state; placing a contact face of a vacuum bag of the composite compaction system in contact with a material on a support structure; and placing the number of morphable bag supports in an engaged state to conform to the support structure, wherein each of the number of morphable bag supports comprises a plurality of fingers separated by gaps and a plurality of pressure chambers within the plurality of fingers, wherein holding the number of morphable bag supports in the retracted state comprises applying a vacuum to the plurality of pressure chambers within the plurality of fingers, and wherein placing the number of morphable bag supports in the engaged state comprises applying a positive pressure to the plurality of pressure chambers within the plurality of fingers, wherein applying the vacuum to the plurality of pressure chambers within each of the number of morphable bag supports comprises applying a respective vacuum to each morphable bag support of the number of morphable bag supports independently of each other morphable bag support, and wherein applying the positive pressure to the plurality of pressure chambers within each of the number of morphable bag supports comprises applying positive pressure to each morphable bag support of the number of morphable bag supports independently of each other morphable bag support.

2. The method of claim 1 further comprising:
performing compaction of the material on the support structure using the composite compaction system.

3. The method of claim 2, wherein performing compaction comprises applying a vacuum beneath the vacuum bag.

4. The method of claim 2 further comprising:
placing the number of morphable bag supports in the retracted state after performing compaction of the material.

5. The method of claim 1 further comprising:
seating the vacuum bag on a contoured surface of the support structure after placing the number of morphable bag supports in the engaged state to conform to the support structure.

6. A method of supporting a composite compaction system comprising: holding a plurality of morphable bag supports of the composite compaction system in a retracted state; placing a contact face of a vacuum bag of the composite compaction system in contact with a material on a support structure; and placing the plurality of morphable bag supports in an engaged state to conform to the support structure, wherein each of the plurality of morphable bag supports comprises a plurality of fingers separated by gaps and a plurality of pressure chambers within the plurality of fingers, wherein holding the plurality of morphable bag supports in the retracted state comprises applying a vacuum to the plurality of pressure chambers within the plurality of fingers, and wherein placing the plurality of morphable bag supports in the engaged state comprises applying a positive pressure to the plurality of pressure chambers within the plurality of finger, wherein applying the vacuum to the plurality of pressure chambers within each of the plurality of morphable bag supports comprises applying a respective vacuum to each morphable bag support of the plurality of morphable bag supports independently of each other morphable bag support, and wherein applying the positive pressure to the plurality of pressure chambers within each of the plurality of morphable bag supports comprises applying positive pressure to each morphable bag support of the plurality of morphable bag supports independently of each other morphable bag support.

7. The method of claim 6 further comprising:
performing compaction of the material on the support structure using the composite compaction system.

8. The method of claim 7, wherein performing compaction comprises applying a vacuum beneath the vacuum bag.

9. The method of claim 7 further comprising:
placing the plurality of morphable bag supports in the retracted state after performing compaction of the material.

10. The method of claim 6 further comprising:
seating the vacuum bag on a contoured surface of the support structure after placing the plurality of morphable bag supports in the engaged state to conform to the support structure.

11. A method of supporting a composite compaction system comprising: holding four morphable bag supports of the composite compaction system in a retracted state; placing a contact face of a vacuum bag of the composite compaction system in contact with a material on a support structure; and placing the four morphable bag supports in an engaged state to conform to the support structure, wherein each of the four morphable bag supports comprises a plurality of fingers separated by gaps and a plurality of pressure chambers within the plurality of fingers, wherein holding the four morphable bag supports in the retracted state comprises applying a vacuum to the plurality of pressure chambers within the plurality of fingers, and wherein placing the four morphable bag supports in the engaged state comprises applying a positive pressure to the plurality of pressure chambers within the plurality of fingers, wherein applying the vacuum to the plurality of pressure chambers within each of the four morphable bag supports comprises applying a respective vacuum to each morphable bag support of the four morphable bag supports independently of each other morphable bag support, and wherein applying the positive pressure to the plurality of pressure chambers within each of the four morphable bag supports comprises applying positive pressure to each morphable bag support of the four morphable bag supports independently of each other morphable bag support.

12. The method of claim 11 further comprising:
performing compaction of the material on the support structure using the composite compaction system.

13. The method of claim 12, wherein performing compaction comprises applying a vacuum beneath the vacuum bag.

14. The method of claim 12 further comprising:
placing the four morphable bag supports in the retracted state after performing compaction of the material.

15. The method of claim 11 further comprising:
seating the vacuum bag on a contoured surface of the support structure after placing the four morphable bag supports in the engaged state to conform to the support structure.

16. The method of claim 5, further comprising:
performing compaction of the material on the support structure using the composite compaction system.

17. The method of claim 16, wherein performing compaction comprises applying a vacuum beneath the vacuum bag.

18. The method of claim 16, further comprising:
placing the number of morphable bag supports in the retracted state after performing compaction of the material.

19. The method of claim 10, further comprising:
performing compaction of the material on the support structure using the composite compaction system.

20. The method of claim 19, wherein performing compaction comprises applying a vacuum beneath the vacuum bag.

21. The method of claim 19, further comprising:
placing the plurality of morphable bag supports in the retracted state after performing compaction of the material.

22. The method of claim 15, further comprising:
performing compaction of the material on the support structure using the composite compaction system.

23. The method of claim 22, wherein performing compaction comprises applying a vacuum beneath the vacuum bag.

24. The method of claim 22, further comprising:
placing the four morphable bag supports in the retracted state after performing compaction of the material.

* * * * *